US 6,719,900 B2

(12) United States Patent
Hawkins

(10) Patent No.: US 6,719,900 B2
(45) Date of Patent: Apr. 13, 2004

(54) AGRICULTURAL OR INDUSTRIAL SPIN FILTER

(75) Inventor: Stanley E. Hawkins, Visalia, CA (US)

(73) Assignee: Agricultural Products, Inc., Ontario (CA)

(*) Notice: Subject to any disclaimer, the term of this patent is extended or adjusted under 35 U.S.C. 154(b) by 100 days.

(21) Appl. No.: 10/106,621

(22) Filed: Mar. 26, 2002

(65) Prior Publication Data

US 2003/0183587 A1 Oct. 2, 2003

Related U.S. Application Data

(63) Continuation of application No. PCT/US01/40375, filed on Mar. 26, 2001.
(60) Provisional application No. 60/210,630, filed on Jun. 9, 2000, and provisional application No. 60/241,110, filed on Oct. 17, 2000.

(51) Int. Cl.[7] .................. B01D 21/26; B01D 35/16; B01D 27/00
(52) U.S. Cl. .............. 210/248; 210/787; 210/806; 210/295; 210/304; 210/416.1; 210/446; 210/499
(58) Field of Search .................. 210/787, 806, 210/248, 295, 304, 416.1, 446, 499

(56) References Cited

U.S. PATENT DOCUMENTS

| 111,701 A | * | 2/1871 | Thomson | 210/452 |
|---|---|---|---|---|
| 3,695,443 A | * | 10/1972 | Schmidt, Jr. | 210/497.01 |
| 4,495,072 A | * | 1/1985 | Fields | 210/433.1 |
| 4,543,188 A | * | 9/1985 | Okouchi et al. | 210/304 |
| 5,500,134 A | * | 3/1996 | Chahine | 210/787 |
| 5,545,318 A | * | 8/1996 | Richmond | 210/497.01 |
| 5,863,443 A | * | 1/1999 | Mainwaring | 210/800 |
| 5,897,787 A | * | 4/1999 | Keller | 210/767 |

* cited by examiner

Primary Examiner—David A. Reifsnyder
(74) Attorney, Agent, or Firm—Daniel L. Dawes; Myers Dawes Andras & Sherman LLP

(57) ABSTRACT

An agricultural or industrial water filter comprises a spin plate, a flow distributing sleeve, and a cone basin. The spin plate includes fluid passageways disposed at a 20 degree angle relative to the axis of the filter. The flow distributing sleeve is disposed in between the screen and the filter chamber. The screen may be oversize with a screen area that is a multiple of the screen area of a standard screen. The sleeve comprises a plurality of axial slots which are more narrow at the proximal side and wider at the distal side. The end cap is coupled to a bottom of the filter chamber and disposed adjacent to a bottom of the screen. The end cap comprises a cone coupled to the top of a basin. The cone extends upwardly into the space within the screen. A narrow annulus with a small cross-sectional area is formed between the bottom edge of the cone and the top of the basin. The basin includes a flush tube to flush out particles collected in the basin and to cause a high velocity flow through the annulus.

17 Claims, 7 Drawing Sheets

AGRICULTURAL OR INDUSTRIAL SPIN FILTER

RELATED APPLICATIONS

This application is a continuation under 35 USC §120 of PCT Application No. PCT/US01/140375, filed on Mar. 26, 2001, which claims the benefit of priority from Provisional Application Nos. 60/210,630, filed on Jun. 9, 2000 and 60/241,110. filed on Oct. 17, 2000, all of which are incorporated herein by reference in their entirety.

BACKGROUND OF THE INVENTION

1. Field of the Invention

The invention relates generally to agricultural or industrial water filters.

2. Description of Related Art

Fields, "*Filter Screen Device,*" U.S. Pat. No. 4,495,072 (1985), is directed to an agricultural or industrial filter having the inlet and outlet at a shallow angle relative to the filter housing with the configuration causing the liquid passing therethrough to spiral over the outer face of the filter screen. The filter device has a housing with the inlet and outlet. The inner end of the inlet is provided with an opening which is an elongated oval and one side is provided with a lip. The lip has the effect of projecting liquid passing from the inlet into the annular space against the filter screen at an angle to assure that such liquid spirals down the length of the screen for maximum contact.

Thompson, "*Cistern Filter,*" U.S. Pat. No. 111,701 (1871) is directed to a cistern filter having an optional wire gauze cone D that may, if desired, be fitted into flange or rim b to serve to prevent leaves and similar obstructions from covering the filter and preventing obstruction.

Richmond, "*Clog Resistant Water Valve Inlet Screen with Ribs,*" U.S. Pat. No. 5,545,318 (1996), is directed to a clog-resistant water valve inlet screen with ribs that hold large particles and allow water to flow around the particles and the ribs increase the turbulence of the water flow, reducing the stability of the contaminants lodged in the ribs encouraging them away from the openings, encouraging the particles to accumulate at the downstream end of the inlet screen, leaving the upstream end of the inlet with fewer obstructions to block the free flow of water.

Okouchi et.al., "*Apparatus for Removing Foreign Matters from Condenser Cooling Water,*" U.S. Pat. No. 4,543,188 (1985), is directed to a water filter connected tangentially to the input so as to have a swirling flow across the filter surface and is provided with a reverse direction swirling flow depending on the opening of the inlet butterfly valve.

Keller, "*Strainer and Method for Separating Solid Particles from a Liquid,*" U.S. Pat. No. 5,897,787 (1999), is directed to a strainer for separating solid particles from a liquid. The strainer is an inlet and a separator in the form of a cylindrical basket that has a conical shape that extends up in the center that will trap particles removed from the fluid and prevent them from returning to the inlet when the system is shut down. When the basket is removed from its chamber, spillage of any fluid accumulated will be minimized.

Schmidt Jr., "*Filter Apparatus,*" U.S. Pat. No. 3,695,443 (1972), is directed to a filter apparatus having a plurality of sleeves and two end members that provide flow control requiring the liquid passing through the outer tube and sleeve has to go downwardly along the outer surface of the core and up through the hollow cavity in the core during a filtering operation and in reverse during cleaning. The tube filter in the tank has tubes having an externally ribbed tubular plastic core with ribs and holes. Members are fitted over the core and a sleeve and a filter cake supporting tube.

BRIEF SUMMARY OF THE INVENTION

The invention is an improved Y-branched agricultural or industrial water filter. The agricultural or industrial water filter comprises a spin plate, a flow distributing sleeve, and a cone basin. The filter includes a cylindrical filter screen disposed within a filter chamber or barrel. The filter screen may be oversized so as to provide a filter area that is multiple of the screen areas of standard filter screens.

The spin plate is disposed at the inlet end of the filter where water first enters the filter. The spin plate includes fluid passageways comprising apertures formed in a disk and nozzle holes defined by nozzles extending from the bottom surface of the disk. The fluid passageways are disposed at an approximately 20 degree angle relative to the axis of the filter, which is perpendicular to the plane defined by the disk. The fluid passageways direct the water jets to a more oblique angle relative to the filter screen so that entrained sand and grit obliquely flows or impinges on the filter screen at a glancing angle. The nozzles still impart a rotational motion in the system to the water and entrained sand, grit and particles.

The flow distributing sleeve is disposed around the screen in between the screen and the filter chamber. The side of the flow sleeve more closely positioned to the outlet is defined as the proximal side. The side of the flow sleeve opposite the proximal side is defined as the distal side. A wall of the flow sleeve includes multiple wide portions which are spaced closely together at the proximal side of the flow sleeve and narrow portions which are spaced further apart at the distal side of the flow sleeve. An aperture or opening is disposed at the distal side to allow a greater amount of filtered water to pass through. Alternatively stated, the flow sleeve comprises a plurality of axial slots defined in the cylindrical wall of the sleeve, which slots are more narrow at the proximal side of the flow sleeve to decrease the flow of water therethrough and which are wider at the distal side of the flow sleeve to allow more water to flow through. The flow sleeve creates a pressure differential which allows for a more uniform flow of water throughout the circumference of the filter screen.

The end cap is coupled to a bottom of the filter chamber and is disposed adjacent to a bottom of the screen. The end cap comprises a cone coupled to the top of a basin. The cone extends upwardly into the space within the screen. The rotating water is forced toward a larger radius by the cone, thereby serving to impart a higher centrifugal force to the more massive sand grains and particles entrained in the water. This serves to separate out those particles into the trap provided by the cone basin. A narrow annulus with a small cross-sectional area is formed between the bottom edge of the cone and the top of the basin. The basin includes a flush tube to flush out sand, grit and particles collected in the basin and to cause a high velocity flow through the annulus.

In conclusion, an agricultural or industrial water filter comprises a spin plate, a flow distributing sleeve, and a cone basin. The spin plate includes fluid passageways disposed at an approximately 20 degree angle relative to the axis of the filter. The flow distributing sleeve is disposed in between the screen and the filter chamber. The screen may be oversize with a screen area that is multiple times the screen area of a standard screen. The sleeve comprises a plurality of axial slots which are more narrow at the proximal side and wider at the distal side. The end cap is coupled to a bottom of the filter chamber and disposed adjacent to a bottom of the screen. The end cap comprises a cone coupled to the top of a basin. The cone extends upwardly into the space within the screen. A narrow annulus with a small cross-sectional area is formed between the bottom edge of the cone and the top of the basin. The basin includes a flush tube to flush out particles collected in the basin and to cause a high velocity flow through the annulus.

The invention is also a method of filtering agricultural or industrial water using the improved Y-branch filter briefly described above and in more detail below. In general, the method comprises the steps of flowing water through a nozzle plate or disk to create a swirling motion into the cylindrical volume of a screen filter such that the water flow is glanzing or almost tangential to the surface of the screen. The swirling particulate matter is flowed downward into the cylindrical volume of a screen filter into an annular slot with the assistance of a separation cone extending into the cylindrical volume of a screen filter at the base of the cylindrical volume. Separated particulate matter forced through the slot is then collected into a lower basin where it is removed from the flow pattern in the cylindrical volume of a screen filter. A sleeve with differential outlet slots encases the screen filter and creates a corresponding differential resistance to flow, which offsets the unbalance flow which would be created by the close proximity of an outlet to one side of the cylindrical screen filter and its distance from the opposing side of the cylindrical screen filter. The sleeve provides narrower distribution slots and hence greater flow resistance on that side of the sleeve in the proximity of the outlet and wider distribution slots and hence smaller flow resistance on that side of the sleeve opposite from the outlet. The screen can be purged or cleared by opening a purge valve in the collection basin below the separation cone. The tangential or glanzing flow of water, created by the nozzles relative to the screen filter, sweeps the clogged screen filter clear of embedded grains of sand, grit and other lodged debris. In this manner the screen filter is cleared without the need for disassembly and manual cleaning characteristic of all prior art Y-branch filters.

The invention, now having been briefly summarized, may be better visualized by turning to the following drawings wherein like elements are referenced by like numerals.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Figure 1:
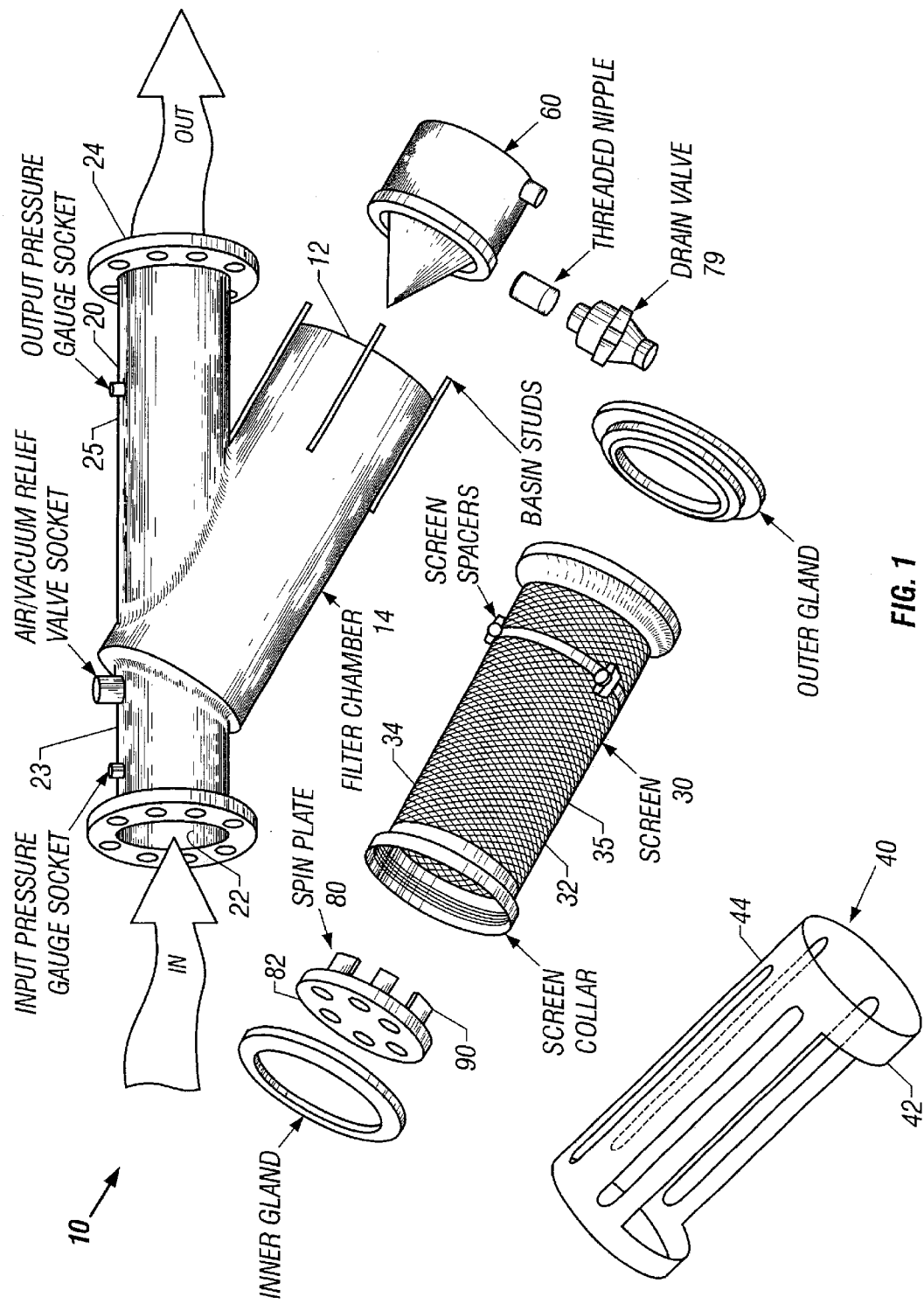
FIG. 1 is an exploded and disassembled view of a Y-branched filter.

The filter apparatus is illustrated in the figures and designated generally by the reference numeral 10. FIG. 1 is an exploded view of a Y-branched filter 10 for filtering liquids with particulate matter, such as water used in agriculture and other applications which may carry sand, grit, small bits of gravel and other hard or abrasive particulate matter. A straight conduit 20 includes an inlet 22 defined by an inlet pipe 23, and an outlet 24 defined by an outlet pipe 25. A diagonally disposed filter chamber 14 intersects the conduit 20. The filter 10 comprises a screen 30. The screen 30 comprises a cylindrical mesh having a plurality of small apertures 32 to enable water to pass through while blocking particulate matter contained therein. In the preferred embodiment, the screen 30 is comprised of stainless steel.

Figure 2:
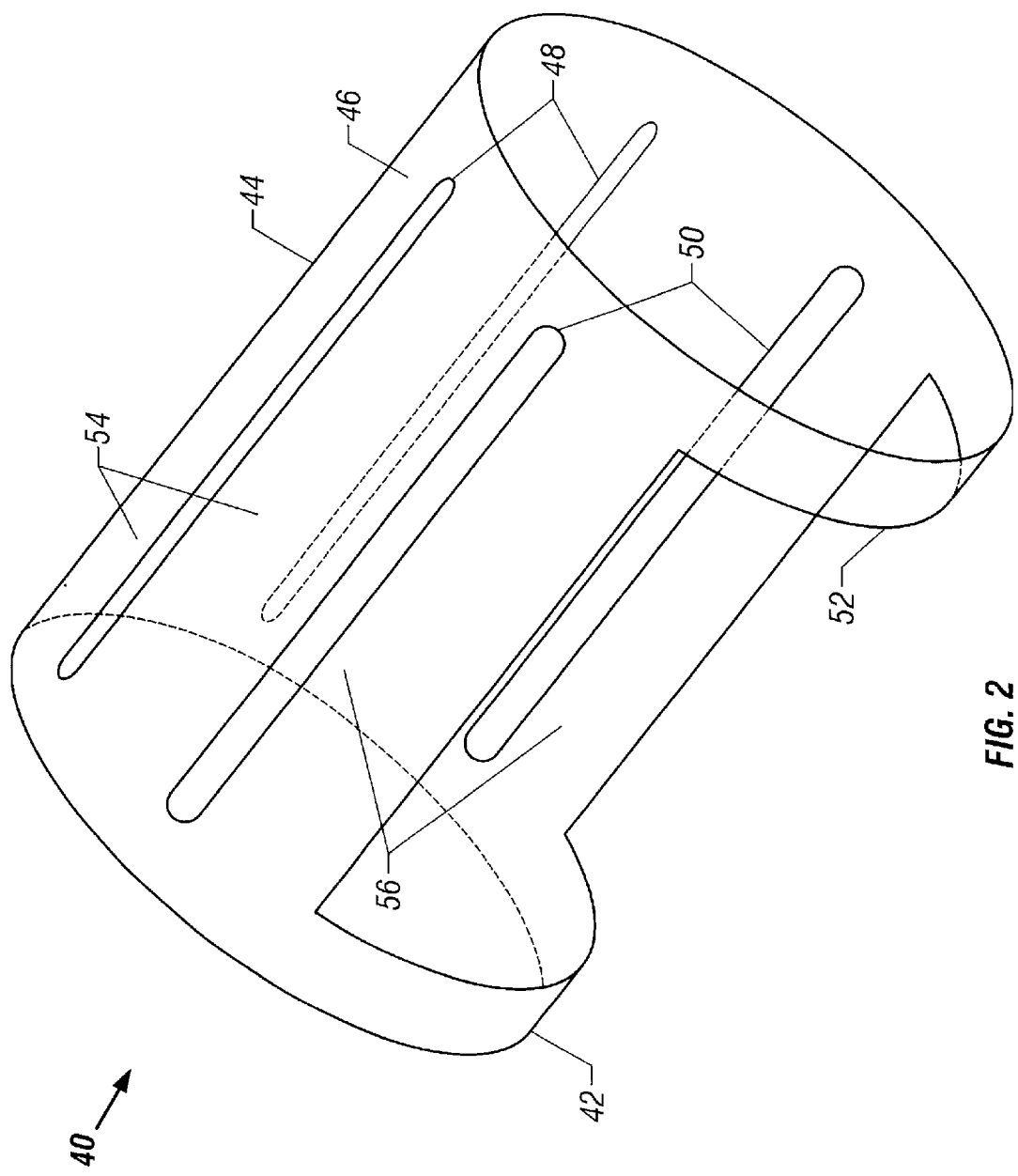
FIG. 2 is a perspective view of a flow distributing sleeve.

A flow distribution sleeve 40 is disposed around the screen 30 with an distal side 42 disposed toward the inlet 22 of the conduit 20 and an proximal side 44 disposed toward the outlet 24 of the conduit 20. The cylindrical sleeve 40 includes a side wall 46 having longitudinal slots 48, 50 best depicted in FIGS. 2 and 3. Wall 46 has an distal side 42 which is oriented toward inlet 22 when sleeve 40 is disposed in chamber 14 and an proximal side 44 which is oriented toward outlet 24 when sleeve 40 is disposed in chamber 14. At the proximal side 44 of the sleeve 40, narrow longitudinal slots 48 are defined therein to restrict the amount of liquid that passes through. Wider longitudinal slots 50 are defined in wall 46 azimuthally away from the proximal side 44 and closer to distal side 42. A window, or large opening 52 is defined in distal side 42. Thus, the sleeve 40 includes a plurality of axial slots or openings 48, 50, 52 which are increasingly larger as they are disposed further from the proximal side 44 and hence outlet 24 when sleeve 40 is disposed in chamber 14.

Alternatively stated, the sleeve 40 comprises a side wall 46 with multiple separated longitudinal portions 54, 56 spaced apart from each other. Outlet wall portions 54 are defined in proximal side 44 which portions 54 are disposed toward outlet 24 when sleeve 40 is disposed in chamber 14. Portions 54 are wider and spaced closer together than the other portions of sleeve 40. Accordingly, disposed between the proximal side 44 and distal side 42 are inlet wall portions 56 which are thinner and spaced further apart than portions 54. As indicated by the flow arrows 41 in FIG. 3, it will become apparent in the operation of the filter 10 that the distribution sleeve 40 causes less water to flow through the proximal side 44 of sleeve 40 and more water to flow through the distal side 42 of sleeve 40.

Figure 4:
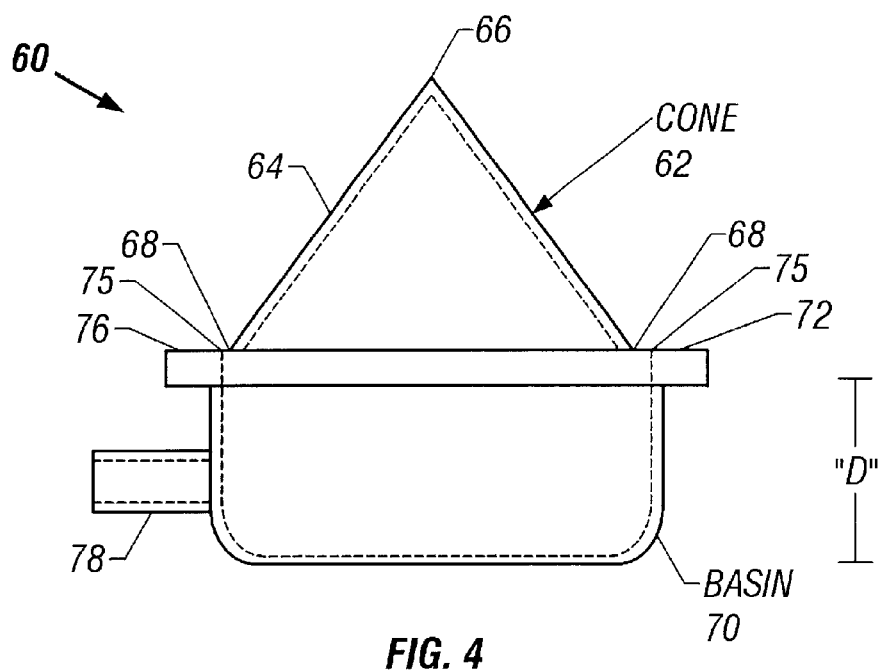
FIG. 4 is an elevation view of the end cap.
Figure 5:
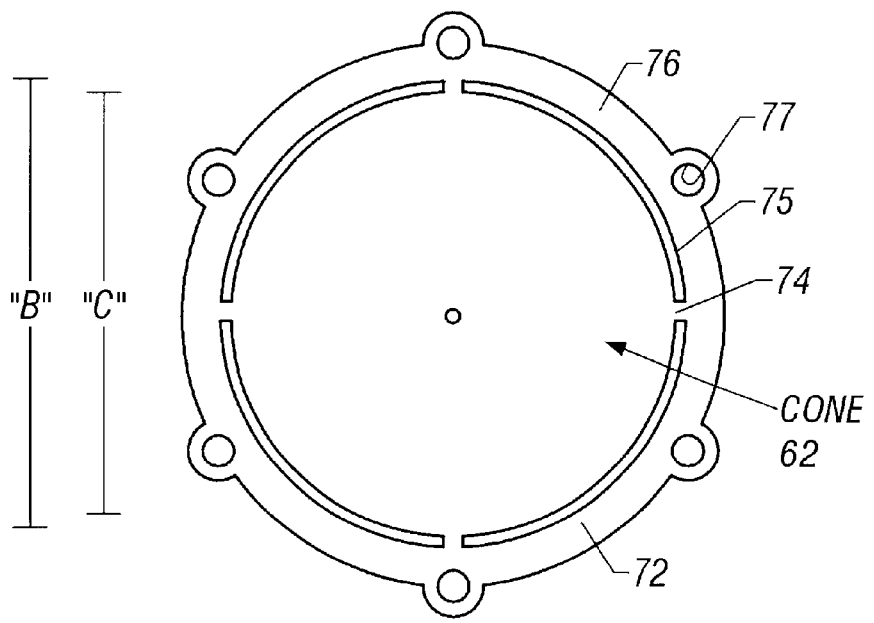
FIG. 5 is a top plan view of an end cap of the filter.

In FIG. 1, the filter 10 includes an end cap 60. The end cap 60 is disposed adjacent to a bottom 12 of the filter 10. FIG. 4 is an side elevation view of the end cap 60 with hidden view lines to show thickness of the structure. The end cap 60 includes a cone 62 protruding upwardly from a basin 70. The cone 62 may be integral with or separate from the basin 70. The cone 62 includes a conical wall 64 which converges upwardly to a tip 66 and diverges downwardly to a circular base 68. The base 68 of the cone 62 is disposed adjacent to a top 72 of the basin 70. Though the cone 62 is hollow in the preferred embodiment, the cone 62 may also comprise a solid core. In FIG. 5, the cone base 68 has a diameter "C" that is slightly less than the inner diameter "B" of the basin 70 so as to create a narrow annular gap or annulus 75 between basin 70 and cone 62. In the preferred embodiment wherein the cone 62 is integral with the basin 70, the cone 62 is connected to the basin 70 at multiple attachment lands 74. Thus, the attachment lands 74 divide the annulus 75 into several sections. The annulus 75 has a relatively small area compared to the cross-sectional area of the basin 70. It is to be expressly understood that the cone 62 may be coupled to the basin 70 in a variety of ways.

At the top 72 of the basin 70, an annular rim 76 includes bores 77 to enable the end cap 60 to be coupled to the filter chamber 14 shown in FIG. 1. The basin 70 has a depth "D" sufficient to collect particulate material, such as sand, grit, gravel and the like, and includes a tube 78 through which the filtered material is flushed. A drain or purge valve 79, as shown in FIG. 1, coupled to the tube 78, enables a user to either continuously or periodically purge the collected contaminants from the basin 70 while the filter 10 operates.

Figure 6:
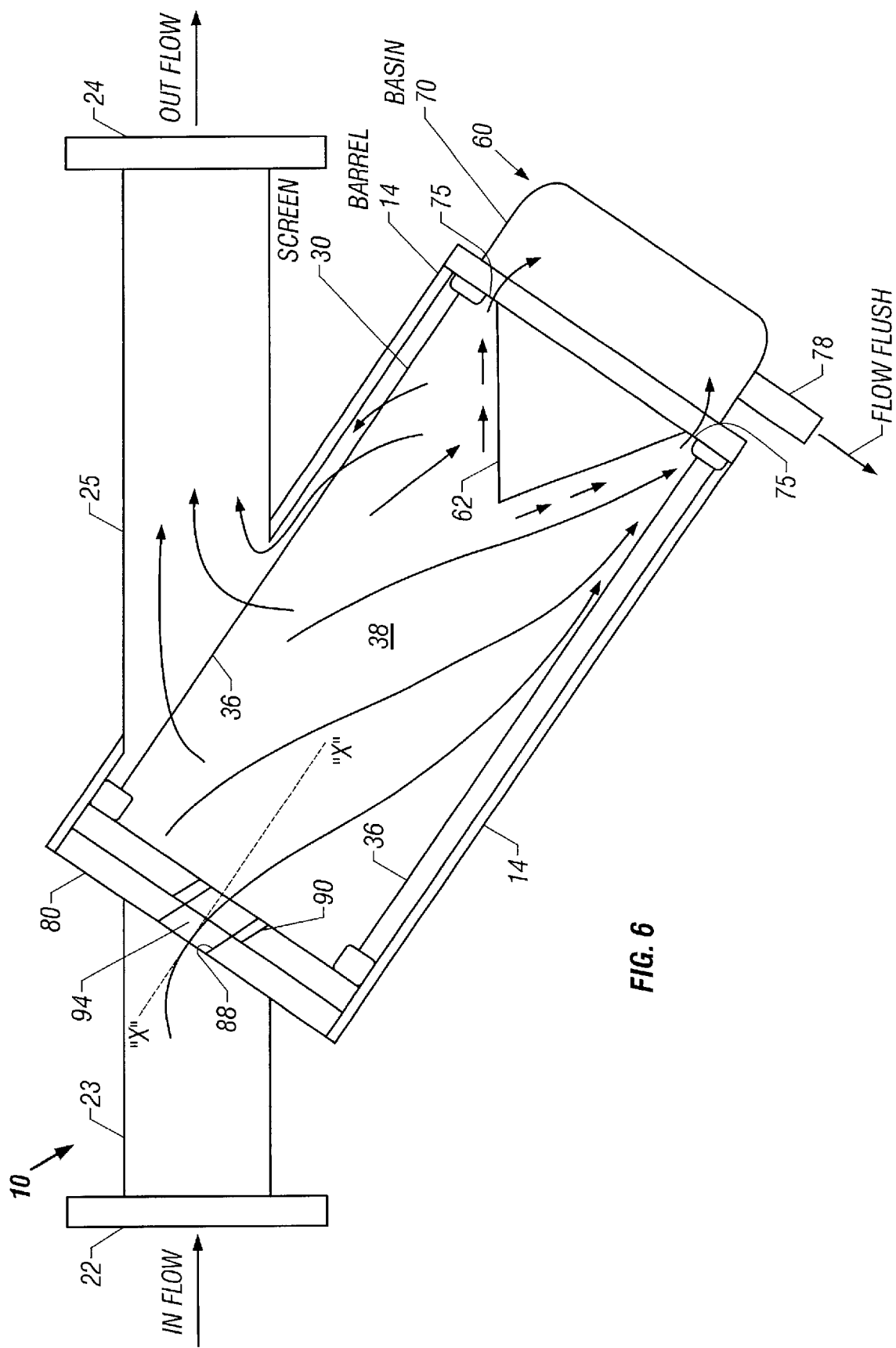
FIG. 6 is a cutaway elevation view of the filter in part, with the distributing sleeve removed to illustrate the operation of the spin plate and end cap according to the present invention.
Figure 7:
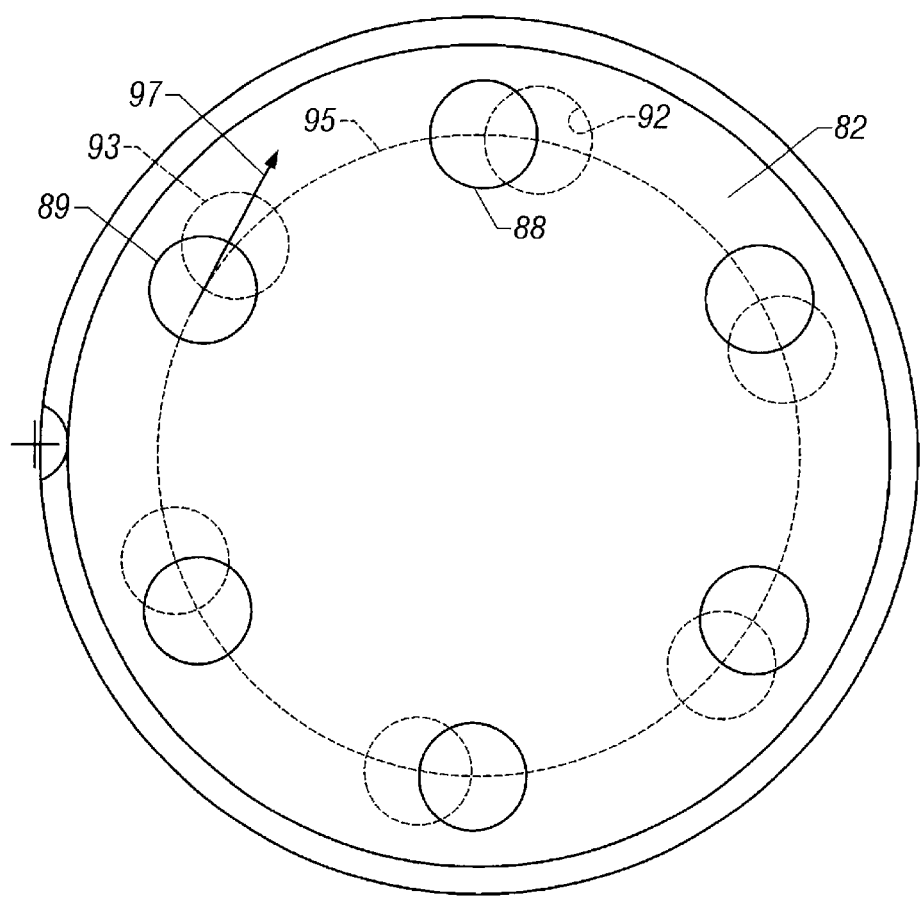
FIG. 7 is a top plan view of the spin plate.
Figure 8:
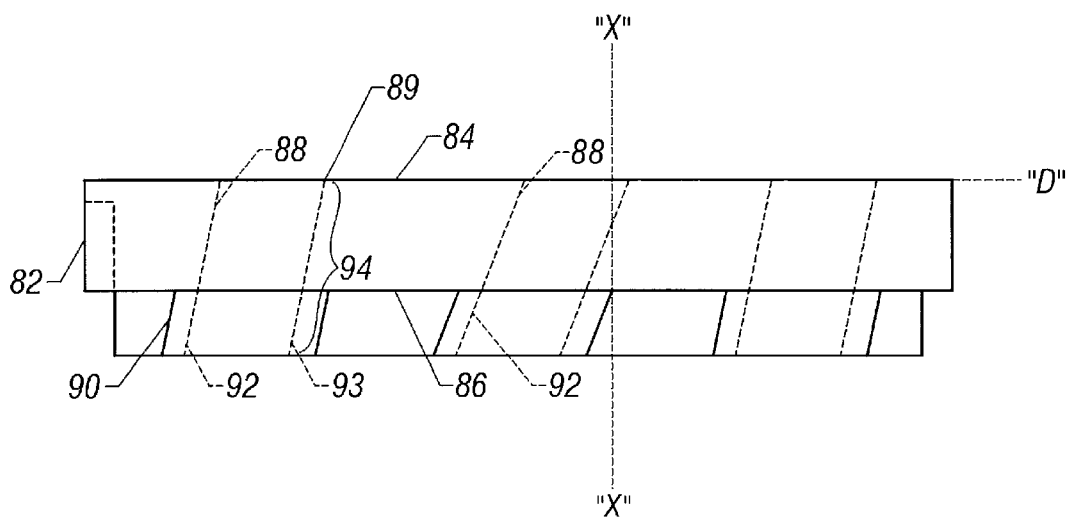
FIG. 8 is a cross-sectional view of the spin plate taken along lines 8—8 of FIG. 7.

In FIG. 1, the filter 10 further comprises a spin plate 80. FIG. 6 is a cutaway elevational view of the filter 10 in part, illustrating the spin plate 80 according to the invention. In FIG. 6, only one fluid passageway 94 with a corresponding 90 is shown for clarity. As best seen in FIG. 8 the spin plate 80 comprises a disk 82 with a top side 84 and a bottom side 86. The disk 82 defines a horizontal plane "D" in the depiction of FIG. 8. In FIG. 7, an azimuthal array of apertures 88 are defined in the disk 82. In FIG. 8 each aperture 88 leads to a corresponding nozzle 90 that extends from the bottom side 86 of the disk 82. The nozzles 90 define nozzle apertures 92 which are in fluid communication with the corresponding apertures 88. As shown in FIG. 7, each aperture 88 and corresponding nozzle aperture 92 define a fluid passageway 94 that is angled at approximately 10 to 30 degrees from a perpendicular axis "X" of the plate 80 that is perpendicular to the plane "D" in the depiction of FIG. 8. In the preferred embodiment, the angle of inclination "I" of the fluid passageways 94 is approximately 20 degrees. While the illustrated embodiment shows a 20 degree azimuthal inclination of the jet relative to a parallel orientation of the longitudinal axis of the filter chamber 14 or screen 35, the invention expressly contemplates any inclination which delivers a glancing or oblique jet to the surface of screen 35 or at least with a tangential component which is predominant or greater than the perpendicular component to the surface of screen 35. The upper edge 89 of aperture 88 is shown in the plan view of FIG. 7 in solid outline, while the lower edge 93 of nozzle aperture 92 is shown in the plan view of FIG. 7 in dotted outline. Apertures 88 are defined in disk 82 to lie with their centers on a common radius 95 shown in FIG. 7. The opposing nozzle aperture 92 has its center defined on a tangent to circle 95 drawn from the center of the opposing corresponding aperture 88. In this manner there is a slight radially outward direction to the water flow through the direction defined through the centers of aperture 88 and its corresponding opposing nozzle aperture 92.

The structure of the filter 10 now having been described, turn now to its operation. As best seen in FIG. 6 water is pumped by an exterior pump through inlet 22 into inlet pipe 23. It is injected by nozzles 92 in disk 82 into the cylindrical interior volume of screen 30 with a rotational and slight radially outward bias or motion. Water flows through screen 30 to the space between screen 30 and sleeve 40. It then flows through sleeve 40 through apertures 48, 50 and 52 to the cylindrical annular space between barrel or chamber 14 and thence to outlet pipe 25 and outlet 24. Particulate matter is separated from the water by screen 30. The particulate matter continues to swirl down the inner longitudinal surface of screen 30 by means of the force imparted to it by nozzles 92 and is spread by cone 62 into annular gap 75. The particular matter thus has lost much of its energy of motion at this time and swirls and accumulates in basin 70 to be periodically purged through drain pipe 78 and valve 79.

In FIG. 1 the outlet pipe 25 is attached to the filter chamber 14 and is disposed very closely to the screen 30 contained within. Due to this location and the high velocity of water being pushed into the outlet pipe 25, the screen 30 could be subjected to high flow rates of water and contaminants in the proximity of outlet pipe 25. If not for the flow restrictions created by distribution flow sleeve 40, the proximal outlet area 34 of the screen 30 would tend to become rapidly clogged due to the localized flow which would pin or impregnate the particulate matter into the screen 30. Once the outlet area 34 of the screen 30 becomes plugged, the average flow of water through the remaining screen areas is increased, thus leading to more rapid plugging.

Figure 3:
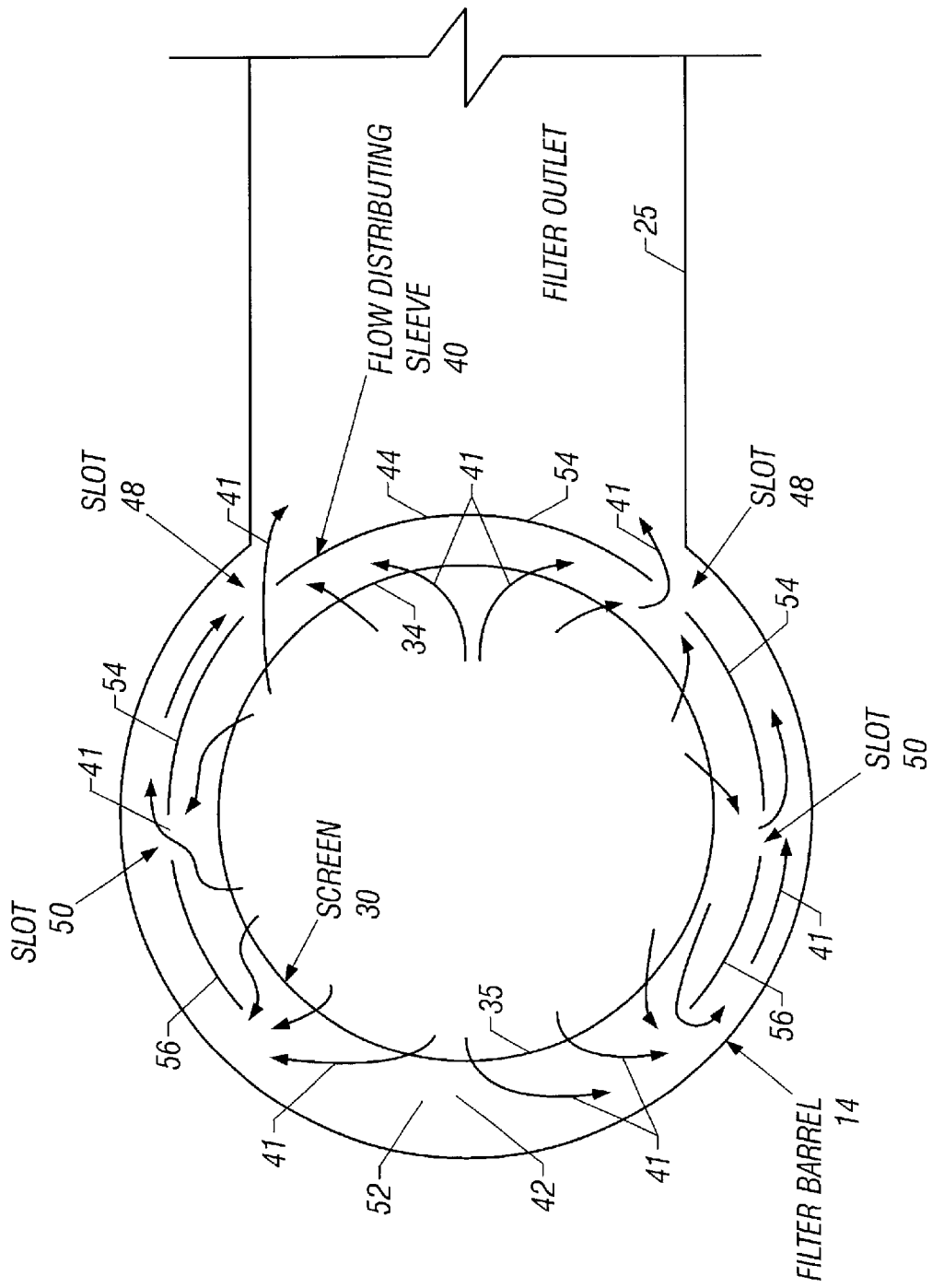
FIG. 3 is a cross-sectional view of the filter taken along lines 3—3 of FIG. 1.

In FIG. 3, it will be appreciated that the flow distributing sleeve 40 causes more uniform water flow throughout the screen areas. The wide wall portions 54 adjacent to the proximal side 44 of the sleeve 40 helps block water from going directly through into the outlet pipe 25, except through the narrow slots 48. At the same time, the wide slots 50 and window 52 adjacent to the distal side 42 of the sleeve 40, allow water to flow more freely exit the screen 30 and travel around the sleeve 40 to the outlet pipe 25. Alternatively stated, slots 48, 50 and 52 in sleeve 40 create a variable flow resistance in chamber 14 which offsets the flow bias that is created by the proximity of outlet 24 to one side of the filter. As a result, the distribution sleeve 40 creates an offsetting pressure differential around the circumference of the screen 30 that is higher adjacent to the proximal side 34 and lower adjacent to an distal side 35. This leads to more uniform water flow throughout the circumference of the screen 30, thereby decreasing plugging and increasing the screen's 30 period of operation without need for maintenance.

In FIG. 6, the distributing sleeve 40 is removed to better illustrate the operation of the spin plate 80 and the end cap 60. In the prior art basins without cones, high levels of particles in the water, such as sand, or even moderate levels of organic contaminants, such as algae, can lead to buildup inside the screen 30 unless a great amount of water is flushed from the basin. The cone 62 prevents buildup of particles inside the screen 30 even with a small to moderate flow of water. The spinning action of the spin plate 80 causes water to spin inside the screen 30 wherein centrifugal force causes particles to be moved outward from the center of the screen 30. Furthermore, the flow of water is directed outward through the screen 30 resulting in particles being displaced adjacent to the inner screen surface 36. Gravity also acts on the particles causing them to move downward toward the end cap 60. In combination with these forces, the geometric shape of the cone 62 projecting upward into the space 38 inside the screen 30 guides particles to the bottom edge of the cone 62 through the annulus 75, an in particular the lighter particles on which the effect of centrifugal force is less. With a small flow of water from the basin flush tube 78, a relatively high velocity is created in the annulus 75 because of its small cross-sectional area, as shown in FIG. 5. This high velocity flow through the annulus 75 tends to vacuum or suction away the concentrated particles present at this location. It will be appreciated that the end cap 60 is able to cause higher levels of contamination of heavy particles, such as sand, to settle out even with a small to moderate flow rate through the flush port 78. Furthermore, organic particles which are lightweight and more buoyant will also be flushed out with a small to moderate flow rate through the flush port 78 due to the concentrating action of the end cap 60.

FIG. 6 also illustrates the advantages offered by the spin plate 80. With the fluid passageways 94 being formed at a 20 degree angle to the axis "X", several advantages result. With a more narrow angle of inclination "I", streams of water coming out of the fluid passageways 94 are directed downward and across the screen 30, skimming down the screen 30 at a very low angle of incidence. Prior art spin plates with a higher degree of inclination tend to direct water right into the screen, causing the screen to become more easily clogged and causing a sandblasting effect such that prior art screens rapidly wear out at the primary water flow impact areas. The skimming action created by the spin plate 80 yields a much smaller component of velocity in the direction perpendicular to the longitudinal axis "X" of the filter 10, namely the velocity from a center of the screen 30 outward. Accordingly, the sandblasting effect on the screens is reduced. The centrifugal force is decreased slightly since this is a function only of the rotational component of velocity. Lighter particles which are not influenced as much by the centrifugal force are also directed downward toward the end cap 60. The lower angle of orientation of the fluid passageways 94, as determined by the apertures 88 and nozzles 90, also leads to a higher component of velocity along the longitudinal axis "X" of the filter 10. This helps push the flow along the inside diameter of the screen 30 more strongly toward the end cap 60 at the bottom of the filter 10.

It will be appreciated that the spin plate 80 prevents the screen 30 from becoming as easily clogged. Should the screen 30 become clogged, however, the spin plate 80 offers a unique self-cleaning feature in a surprising manner which is uncommon to the filters of the prior art. In prior art filters, the screen would have to be separated out from the filter and sprayed with water from the outside in to remove embedded particles. By opening an oversize basin purge valve which is large enough to accept the full filter flow, water may be flushed through the spin plate 80. In merely seconds, the glanzing sweeping action of the nozzles 90 will remove most of the material imbedded in the screen 30. Therefore, the screen 30 need not be removed from the rest of the filter 10 in order to be unclogged. This substantially decreases maintenance time and ease in the field.

The spin plate 80 also works well with the end cap 60 according to the present invention. Specifically, the spin plate 80 pushes collected particles directly into the annulus 75 such that the particles become trapped or less prone to re-mix with the water in the screen 30, a feature that is particularly important when filtering out organic matter.

Figure 9:
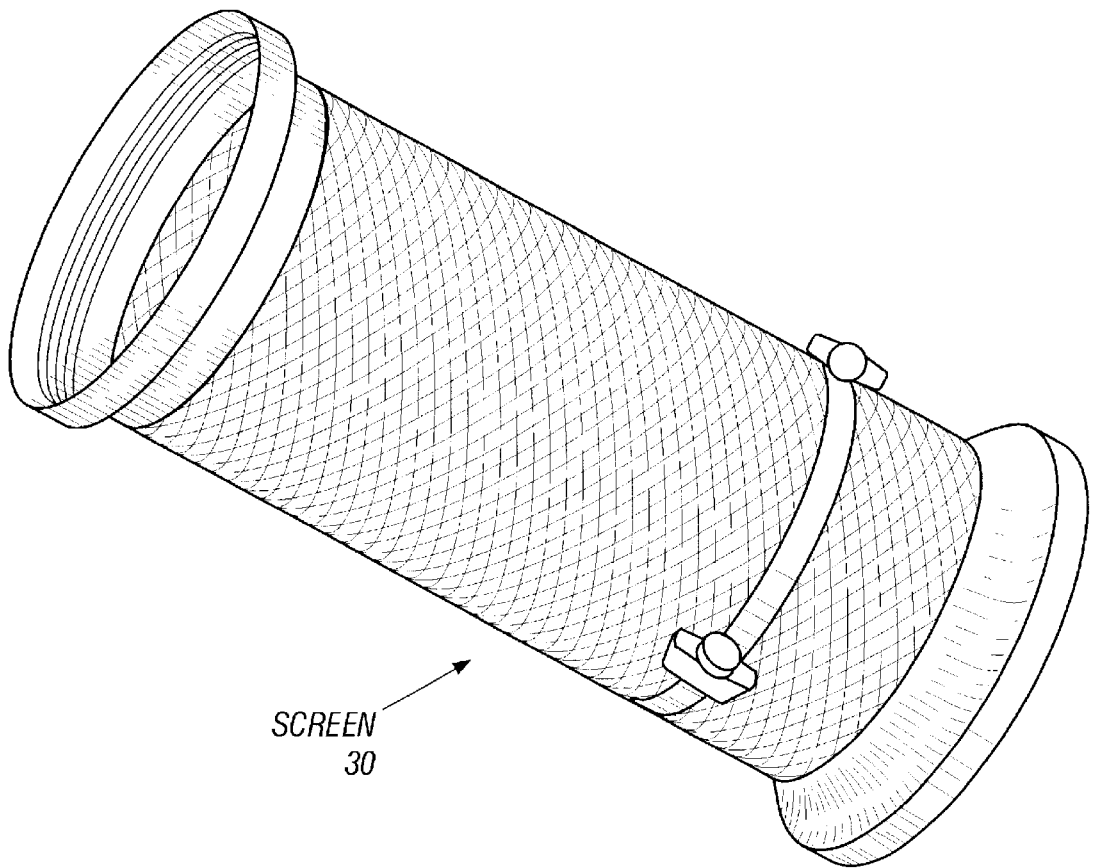
FIG. 9 is a perspective view of an oversize screen.

In FIG. 9, an oversize screen 30 may be provided having, as an example, a diameter of roughly 9.4 inches. The oversize screen 30 provides a screen area that is multiples the screen area many times over that provided by a prior art screen so as to reduce the average velocity of water passing through each square inch of the screen 30. In the preferred embodiment, the screen area is roughly 2.5 times the screen area of a standard screen, namely 559 sq. inches as opposed to 203 sq. inches.

With the reduced flow-through velocity provided by the oversize screen 30, the prevention of localized high velocity areas provided by the distributing sleeve 40, the sweeping action afforded by the spin plate 80, and the concentration of particles enabled by the coned end cap 60, the end result is a filter 10 which more effectively filters out heavy and light particles without becoming easily clogged. It will further be appreciated that the self-cleaning feature of the filter 10 lengthens the uninterrupted duration of usage without need for maintenance or replacement. Overall, this increases efficiency and minimizes costs in filtering out agricultural or industrial water.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention which could be more broadly or narrowly defined later by patent claims.

For example, although the illustrated embodiment is described in terms of a high volume water filter used for agricultural purposes, such as supplying the main water source for a large drip irrigation system, the invention contemplates use in any other fluid filter system as well, including nonaqueous filters used for industrial filtration processes.

The words used in this specification to describe the invention, and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in later in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in later defined claims or that a single element may be substituted for two or more elements in later defined claims.

Insubstantial changes from the claimed subject matter as viewed by a person with ordinary skill in the art, now known or later devised, are expressly contemplated as being equivalently within the scope of the invention. Therefore, obvious substitutions now or later known to one with ordinary skill in the art are defined to be within the scope of the defined elements.

The invention is thus to be understood to include what is specifically illustrated and described above, what is conceptionally equivalent, what can be obviously substituted and also what essentially incorporates the essential idea of the invention.

I claim:

1. An improvement in a water filter having an inlet and an outlet, a cylindrical filter screen disposed within a filter chamber comprising:
   a spin plate disposed at the inlet to define and direct water jets at an oblique angle relative to the filter screen so that entrained sand and grit obliquely flows onto the filter screen at a glancing angle;
   a flow distributing sleeve; and
   a cone basin.

2. The improvement of claim 1 where the filter screen has a longitudinal axis and where said water jets are azimuthally directed at approximately a 20 degree angle relative to the longitudinal axis of the filter screen.

3. The improvement of claim 1 where the spin plate imparts a rotational motion within the filter chamber to the water flowing through the spin plate to entrain particles in the water to centrifugally collect the particles in the cone basin.

4. The improvement of claim 1 wherein the flow distributing sleeve is disposed around the filter screen between the filter screen and the filter chamber, the flow distributing sleeve comprising a wall, an distal side of the wall and an proximal side of the wall, wherein the proximal side faces the outlet of the water filter while the distal side faces the inlet of the water filter, the wall of the flow sleeve comprises multiple wide wall portions which are spaced closely together at the proximal side of the flow sleeve and narrow wall portions which are spaced further apart at the distal side of the flow sleeve, and an aperture disposed at the distal side of the wall of the flow sleeve to allow a greater amount of filtered water to pass therethrough.

5. The improvement of claim 1 wherein the flow sleeve comprises a cylindrical wall and a plurality of axial slots defined in the cylindrical wall of the sleeve, wherein the cylindrical wall has an distal side and an proximal side, which axial slots are narrower at the proximal side of the flow sleeve to decrease the flow of water therethrough and which axial slots are wider at the distal side of the flow sleeve to increase the flow of water therethrough.

6. The improvement of claim 1 where the flow sleeve comprises a wall with an proximal side and a plurality of apertures defined through the wall and where the outlet of the water filter is positioned adjacent to the proximal side of the flow sleeve, the plurality of apertures being defined through the wall to create a pressure differential along the wall to counteract lower flow resistance in proximity to the outlet of the water filter to result in a more uniform flow of water through the filter screen exiting through the outlet of the water filter.

7. The improvement of claim 1 where the filter screen and filter chamber each have a bottom as defined by the direction of gravity and the cone basin is coupled to the bottom of the filter chamber and is disposed adjacent to a bottom of the filter screen, where the cone basin comprises a cone and a basin each with a top and a bottom, which cone is coupled to the top of the basin, the cone extends upwardly into the filter screen, so that rotating water is forced toward a larger radius of movement by the cone, thereby serving to impart a higher centrifugal force to particles entrained in the water to separate out and trap the particles into the basin.

8. The improvement of claim 7 further comprising a narrow annulus with a small cross-sectional area formed between the bottom of the cone and the top of the basin, wherein the basin comprises a flush tube to flush out particles collected in the basin and to induce a high velocity flow through the narrow annulus.

9. A fluid filter comprising:
a y-branched filter chamber having an inlet and an outlet, and a top and a bottom defined by gravitational orientation;
a spin plate disposed in the filter chamber and having a first longitudinal axis;
a filter screen having a second longitudinal axis, a top and a bottom as defined by gravitational orientation and an interior supplied with fluid from the spin plate and disposed in the filter chamber, the first and second longitudinal axes being collinear;
a flow distributing sleeve disposed in the filter chamber outside of the filter screen and having an inlet and proximal side; and
an end cap having a top extending into the bottom of the interior of the filter screen;
wherein the spin plate comprises fluid passageways disposed therethrough at an approximal 20 degree angle azimuthally inclined relative to the second longitudinal axis of the filter screen;
wherein the flow distribution sleeve comprises a plurality of axial slots which are narrower at the proximal side and wider at the distal side;
wherein the end cap is coupled to the bottom of the filter chamber and disposed adjacent to a bottom of the filter screen, and wherein the end cap is comprised of a cone with a top and a bottom as defined by gravitational orientation and a basin with a top and a bottom as defined by gravitational orientation in which the cone is coupled to the top of a basin, where the top of the cone forms the top of the end cap which extends upwardly into the interior of the filter screen, where a narrow annulus with a small cross-sectional area is defined between the bottom of the cone and the top of the basin, where the basin comprises an openable flush tube to flush out particles collected in the basin and to induce a high velocity flow through the annulus when the flush tube is opened.

10. A high volume fluid filter comprising:
a filter chamber means for providing a gravitationally oriented filtration space having an inlet and an outlet;
a cylindrical filter screen means for filtering out particles, the filter screen means being disposed within the filter chamber means;
a spin plate means disposed in fluidic communication to the inlet for defining fluid jets at an oblique angle relative to the filter screen so that particles entrained in the flow obliquely flow against the filter screen means;
a flow distributing sleeve means for distributing flow across the filter screen means according to a predetermined pattern; and
a cone basin means for collecting the particles.

11. The fluid filter of claim 10 where the filter screen means has a longitudinal axis and where said fluid jets are azimuthally directed at approximately a 20 degree angle relative to the longitudinal axis of the filter screen means.

12. The fluid filter of claim 1 where the spin plate means imparts a rotational motion within the filter chamber to the fluid flowing through the spin plate means to entrain particles in the fluid to centrifugally collect the particles in the cone basin means.

13. The fluid filter of claim 1 wherein the flow distributing sleeve means is disposed around the filter screen means between the filter screen means and the filter chamber means, the flow distributing sleeve means comprising a wall means for providing a barrier to fluid flow, an distal side of the wall means and an proximal side of the wall means, wherein the proximal side faces the outlet of the filter chamber means while the distal side faces the inlet of the filter chamber means, the wall means comprises multiple wide wall portions which are spaced closely together at the proximal side of the flow sleeve means and narrow wall portions which are spaced further apart at the distal side of the flow sleeve means, and an aperture means disposed at the distal side of the wall means for allowing a greater amount of filtered fluid to pass therethrough.

14. The fluid filter of claim 10 wherein the flow sleeve means comprises a cylindrical wall means and a plurality of axial slots defined in the cylindrical wall means, wherein the cylindrical wall means has an distal side and an proximal side, which axial slots are narrower at the proximal side of the cylindrical wall means to decrease the flow of fluid therethrough and which axial slots are wider at the distal side of the cylindrical wall means to increase the flow of fluid therethrough.

15. The fluid filter of claim 10 where the flow sleeve means comprises a wall means with an proximal side and a plurality of apertures defined through the wall means and where the outlet of the filter chamber means is positioned adjacent to the proximal side of the flow sleeve means, the plurality of apertures being defined through the wall means to create a pressure differential along the wall means to counteract lower flow resistance in proximity to the outlet of the filter chamber means to result in a more uniform flow of fluid through the filter screen means exiting through the outlet of the filter chamber means.

16. The fluid filter of claim 10 where the filter screen means and filter chamber means each have a bottom as defined by the orientation of gravity and the cone basin means is coupled to the bottom of the filter chamber means and is disposed adjacent to a bottom of the filter screen means, where the cone basin means comprises a cone means and a basin means each with a top and a bottom, which cone means is coupled to the top of the basin means for collecting particles from the fluid filter, the cone means for imparting a higher centrifugal force to particles entrained in the fluid to separate out and trap the particles into the basin means.

17. The fluid filter of claim 16 further comprising a narrow annulus with a small cross-sectional area formed between the bottom of the cone means and the top of the basin means, wherein the basin means comprises a flushing means for purging particles collected in the basin means and for inducing a high velocity flow through the narrow annulus.

* * * * *

UNITED STATES PATENT AND TRADEMARK OFFICE
CERTIFICATE OF CORRECTION

PATENT NO.     : 6,719,900 B2
DATED          : April 13, 2004
INVENTOR(S)    : Stanley E. Hawkins It is certified that error appears in the above-identified patent and that said Letters Patent is hereby corrected as shown below:

<u>Column 9,</u>
Line 67, should read -- approximate -- rather than "approximal"

Signed and Sealed this

Third Day of May, 2005

JON W. DUDAS
*Director of the United States Patent and Trademark Office*